(12) United States Patent
Fujiwara

(10) Patent No.: US 8,144,404 B2
(45) Date of Patent: Mar. 27, 2012

(54) LENS BARREL

(75) Inventor: Daisuke Fujiwara, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 63 days.

(21) Appl. No.: 12/846,578

(22) Filed: Jul. 29, 2010

(65) Prior Publication Data

US 2011/0026135 A1 Feb. 3, 2011

(30) Foreign Application Priority Data

Jul. 31, 2009 (JP) .................................. 2009-179371

(51) Int. Cl.
*G02B 15/14* (2006.01)
(52) U.S. Cl. ....................................... 359/694; 359/699
(58) Field of Classification Search .................. 359/694, 359/699
See application file for complete search history.

(56) References Cited

U.S. PATENT DOCUMENTS

2005/0057822 A1* 3/2005 Hayashi ........................ 359/694

FOREIGN PATENT DOCUMENTS

JP 11-237541 A 8/1999

* cited by examiner

*Primary Examiner* — Ricky L. Mack
*Assistant Examiner* — James Jones
(74) *Attorney, Agent, or Firm* — Canon U.S.A., Inc. IP Division

(57) ABSTRACT

Distance information is displayed at the time of manual focusing but is not displayed at the time of automatic focusing. By rotating a focus switching ring around an optical axis for automatic focusing, an intermediate ring coupled thereto by a cam and a distance display ring rotatably coupled to the intermediate ring are moved along the optical axis to an image side. At this time, the distance display ring and the manual focus ring are uncoupled from each other. With this switching, the distance information written on the distance display ring is also moved to the image side. Therefore, the distance information, which is visible through an information display window of the focus switching ring at the time of manual focusing, becomes invisible.

4 Claims, 6 Drawing Sheets

LENS BARREL

BACKGROUND OF THE INVENTION

1. Field of the Invention

The present invention relates to a lens barrel in which manual focusing can be performed by rotating a manual focus ring.

2. Description of the Related Art

Hitherto, there has been known a lens for a video camera that has a manual focusing mode in which focusing lenses are manually driven to focus, and an electronic automatic focusing mode in which the focusing lenses are directly driven by a motor to focus. There is also a lens in which a selector switch for switching between the manual focusing mode and the automatic focusing mode is provided in a lens barrel.

For example, Japanese Patent Laid-Open No. 11-237541 discloses a lens barrel that has a selector switch for switching between the manual focusing mode and the automatic focusing mode and in which the modes are switched using a clutch mechanism mounted in an imaging lens.

However, in a lens barrel in which focus lenses are directly driven by a motor, a focus lens barrel that holds a focus lens group and an information display member are not mechanically coupled together, and the information display member does not rotate at the time of automatic focusing. Therefore, unlike the above example, switching between the manual focusing mode and the automatic focusing mode cannot be performed using a clutch mechanism.

Since the information display member does not rotate at the time of automatic focusing, the distance information displayed by the information display member does not correspond with the actual imaging distance. This confuses the user.

SUMMARY OF THE INVENTION

In an aspect of the present invention, a lens barrel includes a focus lens, a motor for driving the focus lens, a manual focus ring, a display unit configured to display information of object distance, a display member on which the information of object distance is displayed, a switching member configured to rotationally operate around an optical axis, and an intermediate ring coupled to the switching member and configured to move in an optical axis direction by rotating the switching member to enable coupling and uncoupling the manual focus ring and the display member. The motor drives the focus lens in response to the rotation of the manual focus ring. When the switching member is rotated to switch to manual focusing, the intermediate ring and the display member are moved to be coupled to the manual focus ring, and with the rotation of the manual focus ring, the information display of the display member becomes visible through the display unit. When the switching member is rotated to switch to automatic focusing, the intermediate ring and the display member are moved to be uncoupled from the manual focus ring, and the information display of the display member becomes invisible through the display unit.

Further features of the present invention will become apparent from the following description of exemplary embodiments with reference to the attached drawings.

DESCRIPTION OF THE EMBODIMENTS

Figure 1:
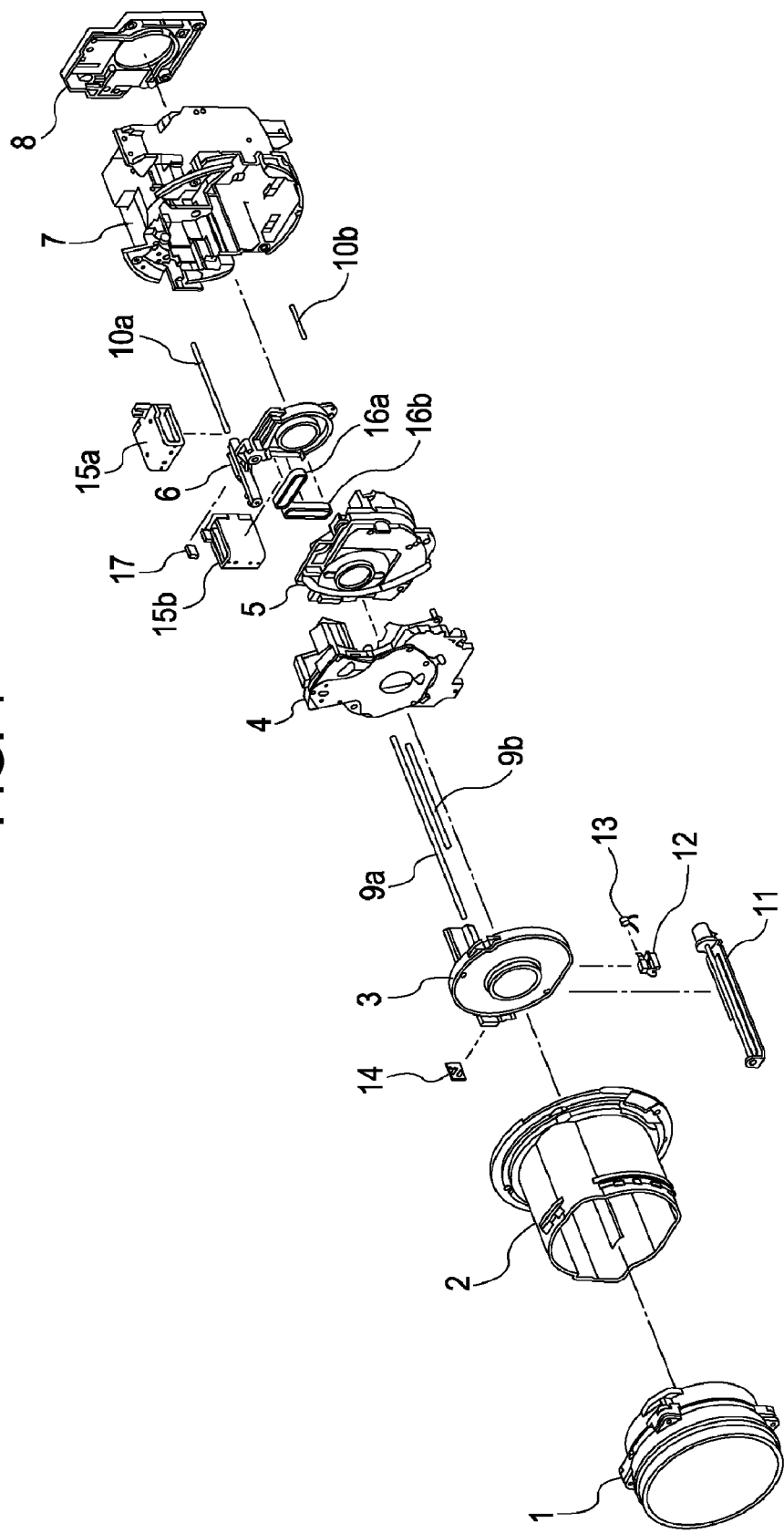
FIG. 1 is an exploded perspective view of a lens barrel according to an embodiment.

The embodiments of the present invention will be described in detail with reference to the drawings. FIG. 1 is an exploded perspective view of a lens barrel for a zoom lens for a video camera. From the object side in the front of the optical axis, a first group barrel 1, a fixed barrel 2, a second group barrel 3, a stop unit 4, an image stabilization unit 5, a fourth barrel 6, a back barrel 7, and a CCD holder 8 are arranged.

The first group barrel 1 holds a first lens group, the fixed barrel 2 holds the first group barrel 1, the second group barrel 3 holds a second lens group that performs zooming, and the fourth group barrel 6 holds a fourth lens group of focus lenses that performs focusing. The second group barrel 3 is held movably in the optical axis direction by two guide bars 9a and 9b disposed between the fixed barrel 2 and the back barrel 7. The guide bars 9a and 9b are disposed with the optical axis therebetween, and guide the second group barrel 3 in the optical axis direction and prevent the second group barrel 3 from rotating around the optical axis.

The stop unit 4 drives stop blades to change the aperture diameter, using an electromagnetic actuator. The image stabilization unit 5 sandwiched between the fixed barrel 2 and the back barrel 7 holds a third lens group of correction lenses that are driven in a plane perpendicular to the optical axis for image stabilization.

The fourth group barrel 6 is held movably in the optical axis direction by two guide bars 10a and 10b held by the image stabilization unit 5 and the back barrel 7. The guide bars 10a and 10b are disposed with the optical axis therebetween, and guide the fourth group barrel 6 in the optical axis direction and prevent the fourth group barrel 6 from rotating around the optical axis.

A zoom motor 11 that is a stepping motor is held by the fixed barrel 2. A driving portion and an output screw portion are integrally held by a U-shaped sheet metal. On the other hand, a rack 12 is attached to the second group barrel 3. The rack 12 meshes with the screw portion of the zoom motor 11, and the second group barrel 3 is thereby driven in the optical axis direction. The rack 12 is urged by a rack spring 13 in the meshing direction and the optical axis direction so as to eliminate the meshing play and the thrust play.

An interrupter 14 is held by the fixed barrel 2. A light-blocking wall (not shown) integral with the second group barrel 3 passes through the space between a light emitting portion and a light receiving portion of the interrupter 14, the reference position of the second group barrel 3 is thereby detected. On the basis of the pulse number input into the zoom motor 11, the second group barrel 3 is driven to each zoom position.

Driving magnets 15a and 15b fixed to the back barrel 7 drive the fourth group barrel 6. Coils 16a and 16b are fixed to the fourth group barrel 6 by gluing or the like. The driving magnets 15a and 15b and the coils 16a and 16b form a linear motor. By applying electrical current to the coils 16a and 16b, a thrust force that drives the fourth group barrel 6 in the optical axis direction is generated. In addition, a position sensor 17 is held by the back barrel 7. The position sensor 17 detects the position of the fourth group barrel 6.

Figure 2:
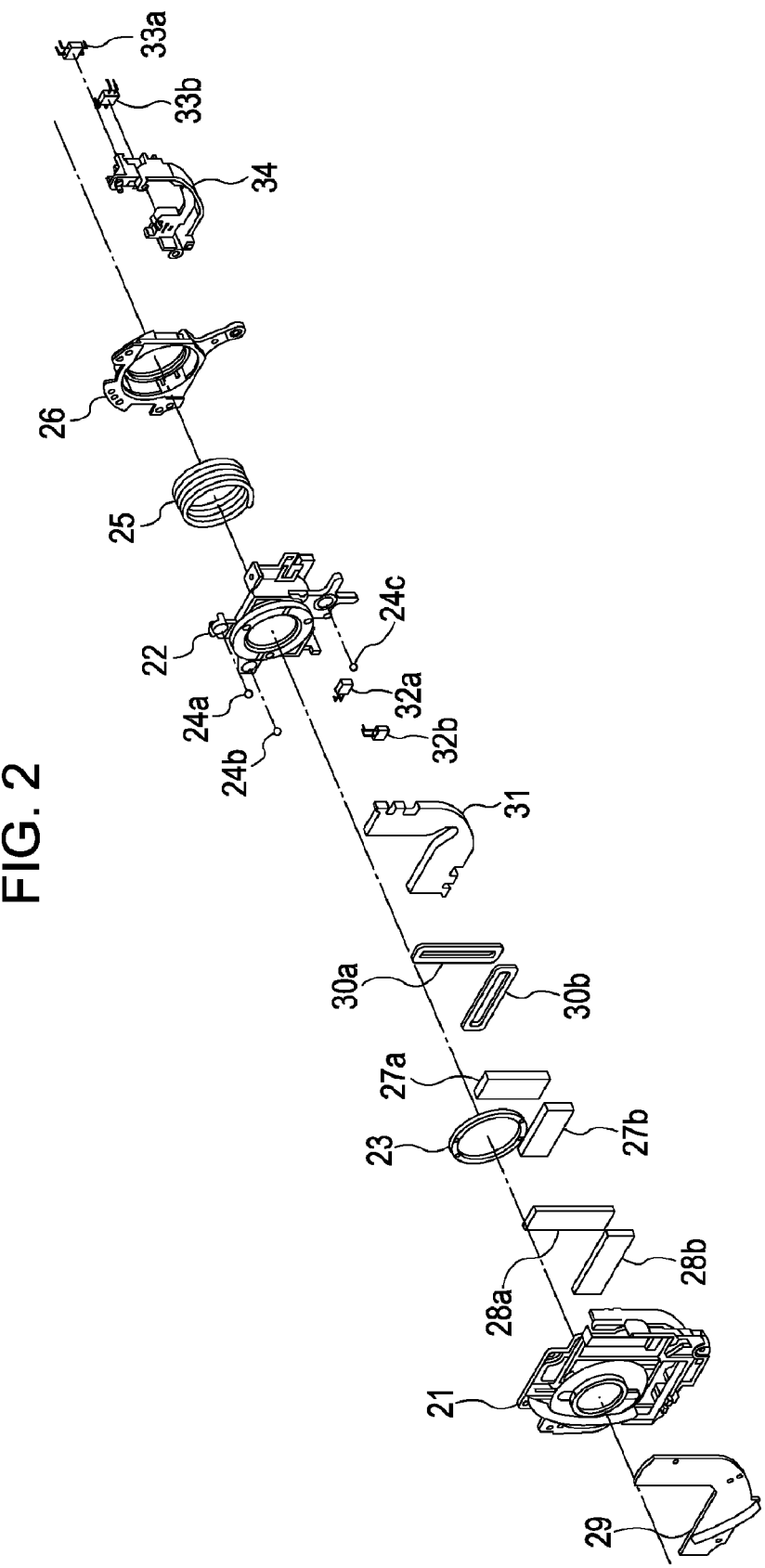
FIG. 2 is an exploded perspective view of an image stabilization unit.

FIG. 2 is an exploded perspective view of the image stabilization unit 5. A fixed frame 21 holds a part of the third lens group and is sandwiched between the fixed barrel 2 and the back barrel 7. A movable frame 22 holds a part of the third lens group that is an image stabilization lens. An anti-rolling frame 23 is not rotatable around the optical axis but is movable in the vertical direction in a plane perpendicular to the optical axis, relative to the fixed frame 21. In addition, the anti-rolling frame 23 is not rotatable around the optical axis but is movable in the vertical and horizontal directions in a plane perpendicular to the optical axis, relative to the movable frame 22. Owing to such a structure, the movable frame 22 is not rotatable but is movable freely in the vertical and horizontal directions in a plane perpendicular to the optical axis, relative to the fixed frame 21.

Three balls 24a, 24b, and 24c are disposed around the optical axis in a plane perpendicular to the optical axis between the fixed frame 21 and the movable frame 22. A shift spring 25 urges the movable frame 22 in the optical axis direction. A spring holder 26 is attached to the fixed frame 21 and urges the movable frame 22 in the optical axis direction via the shift spring 25. Owing to such a structure, the movable frame 22 is urged toward the fixed frame 21 in the optical axis direction and can move freely in a plane perpendicular to the optical axis without play therebetween.

The magnets 27a and 27b are magnetized in such a manner that the inner side and the outer side are magnetized in opposite directions in the optical axis direction. Front yokes 28a and 28b close the magnetic flux on the front side in the optical axis direction of the magnets 27a and 27b. The front yokes 28a and 28b are fixed to the magnets 27a and 27b by magnetic attraction and are held in the fixed frame 21 by a magnet cover 29. Coils 30a and 30b are glued to the movable frame 22. A back yoke 31 closes the magnetic flux on the back side in the optical axis direction of the magnets 27a and 27b. The back yoke 31 is disposed on the opposite side of the coils 30a and 30b from the magnets 27a and 27b and is held by the fixed frame 21. The magnets 27a and 27b, the front yokes 28a and 28b, the back yoke 31, and the coils 30a and 30b form a magnetic circuit.

When electrical current is applied to the coils 30a and 30b, Lorentz forces due to interaction between magnetic forces generated by the magnets 27a and 27b and the coils 30a and 30b are generated in directions substantially perpendicular to the magnetizing boundaries of the magnets 27a and 27b. The movable frame 22 can thereby be moved vertically and horizontally in a plane perpendicular to the optical axis, relative to the fixed frame 21.

Light emitting elements 32a and 32b are held by the movable frame 22, light receiving elements 33a and 33b are held by a sensor holder 34, and the sensor holder 34 is fixed to the fixed frame 21. By such a structure, a position sensor that detects the position of the movable frame 22 is formed.

Figure 3:
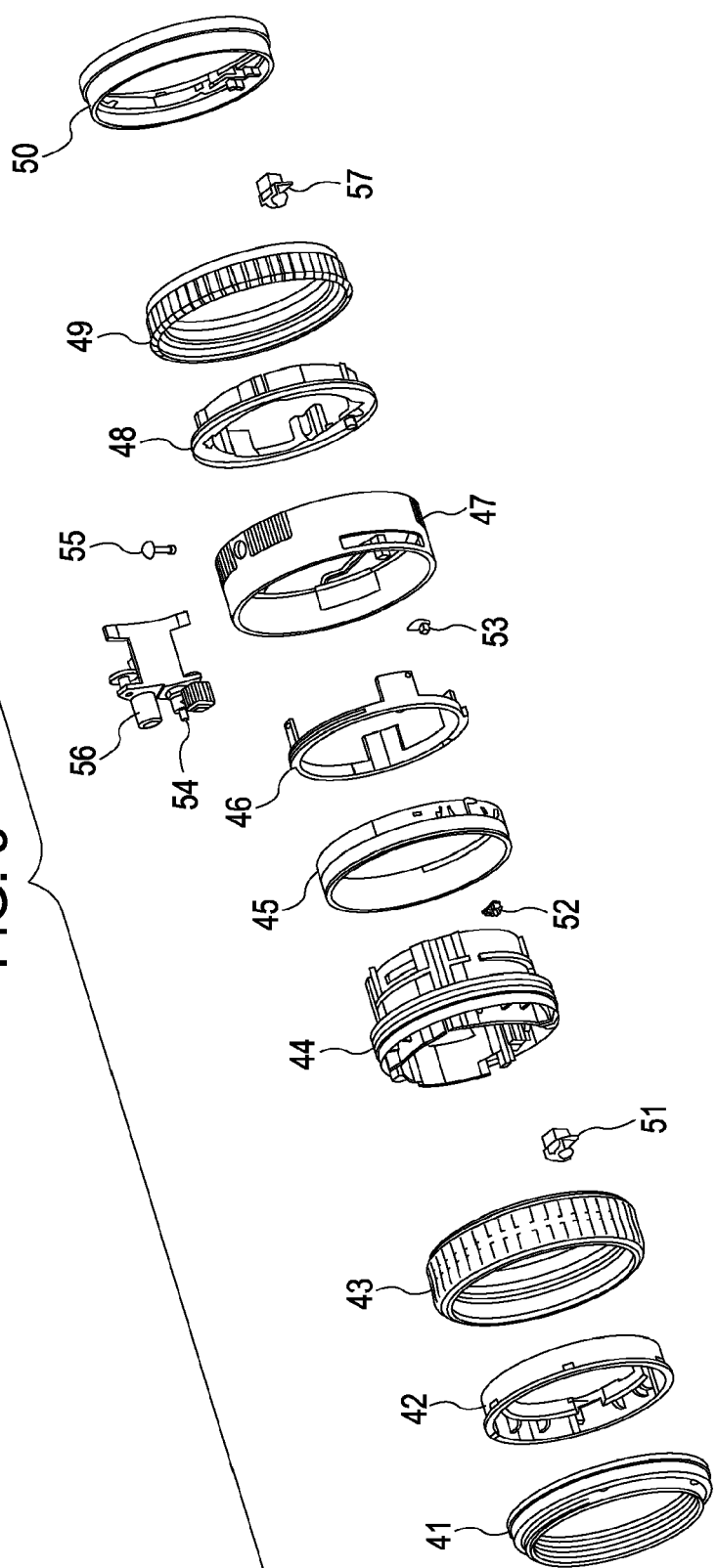
FIG. 3 is an exploded perspective view of an exterior portion.

FIG. 3 is an exploded perspective view of an exterior portion of a lens barrel. Along the optical axis direction, a filter ring 41, a fixed ring 42, a manual focus ring 43, an inner ring 44, a distance display ring 45, an intermediate ring 46, a focus switching ring 47, a fixed ring 48, a manual zoom ring 49, and a fixed ring 50 are arranged.

The filter ring 41 is located at the forefront of the lens. A screw-in filter can be attached to the filter ring 41. The manual focus ring 43 is rotatably sandwiched between the fixed ring 42 and the inner ring 44. A sensor 51 that detects the rotation of the manual focus ring 43 is fixed to the inner ring 44. The distance display ring 45, which is an information display member, is coupled to the manual focus ring 43 by a gear, and is held rotatably around the intermediate ring 46.

The focus switching ring 47 is a switching member for switching between automatic and manual modes and can be rotationally operated. The focus switching ring 47 has a cam groove formed in the inner surface thereof. The cam groove meshes with a protrusion of the intermediate ring 46. By rotating the focus switching ring 47 around the optical axis, the intermediate ring 46 is moved back and forth in the optical axis direction and is brought into and out of contact with the focus switching ring 47. Photointerrupters 52 and 53 detect the position of the intermediate ring 46, and a potentiometer 54 detects the absolute position of the distance display ring 45.

A lock button 55 locks and unlocks the rotation of the focus switching ring 47. The manual zoom ring 49 is rotatably sandwiched between the fixed ring 48 and the fixed ring 50. A potentiometer 54 detects the absolute position of the manual zoom ring 49, and a sensor 57 is held by the fixed ring 50 and detects the rotation of the manual zoom ring 49.

Switching between manual focusing and automatic focusing is performed by rotating the focus switching ring 47 around the optical axis while operating the lock button 55.

Figure 4:
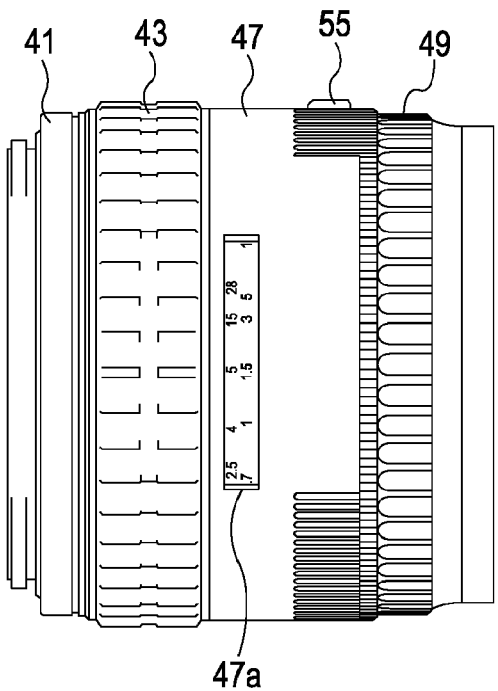
FIG. 4 is a plan view of the exterior portion at the time of manual focusing.
Figure 5:
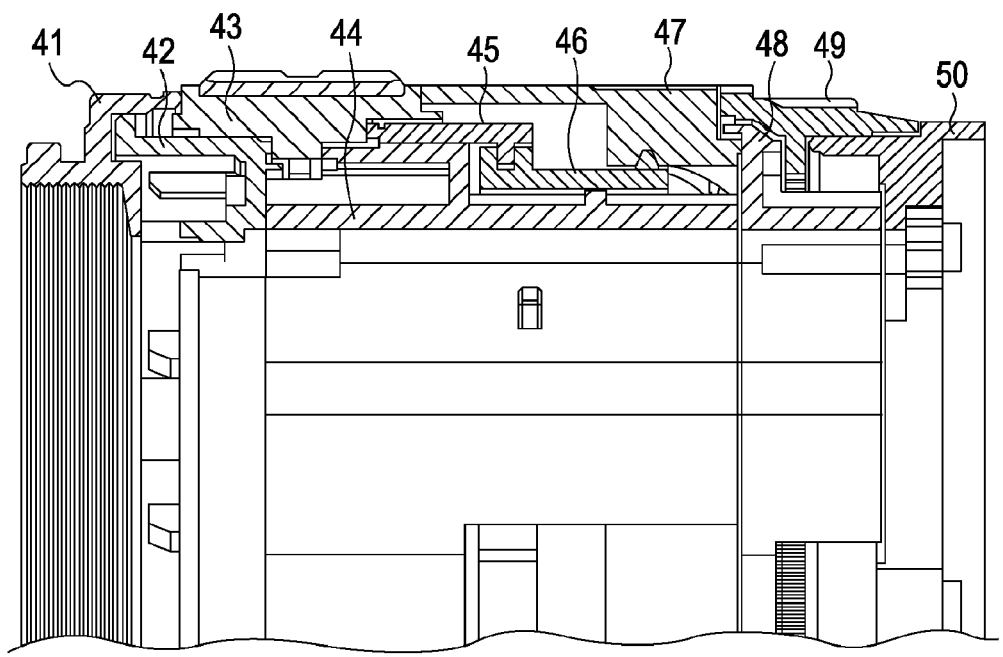
FIG. 5 is an enlarged sectional view of the exterior portion at the time of manual focusing.

FIG. 4 is an external view of the lens exterior portion at the time of manual focusing, and FIG. 5 is an enlarged sectional view thereof. At the time of manual focusing, the user rotates the manual focus ring 43, and the distance display ring 45 is rotated together therewith via the gear. At the same time, on the basis of the detection results of the rotation detecting sensor 51 and the potentiometer 54, the fourth group barrel 6 is driven, and focusing is performed by the focus lenses. The distance information written on the distance display ring 45 becomes visible through an information display window 47a that is provided in the focus switching ring 47 and functions as an information display unit.

Figure 6:
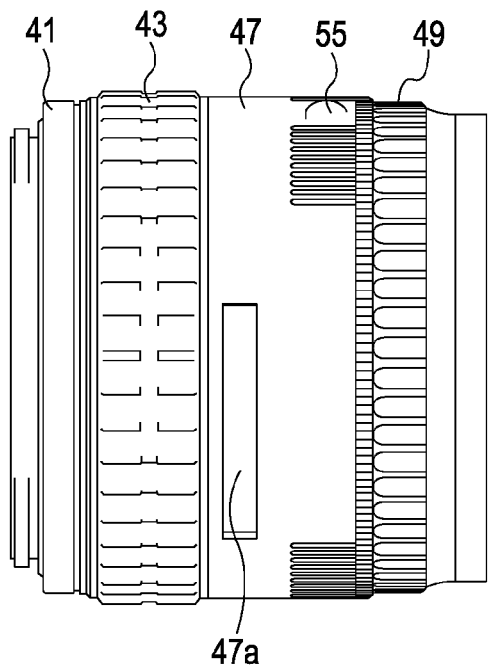
FIG. 6 is a plan view of the exterior portion at the time of automatic focusing.
Figure 7:
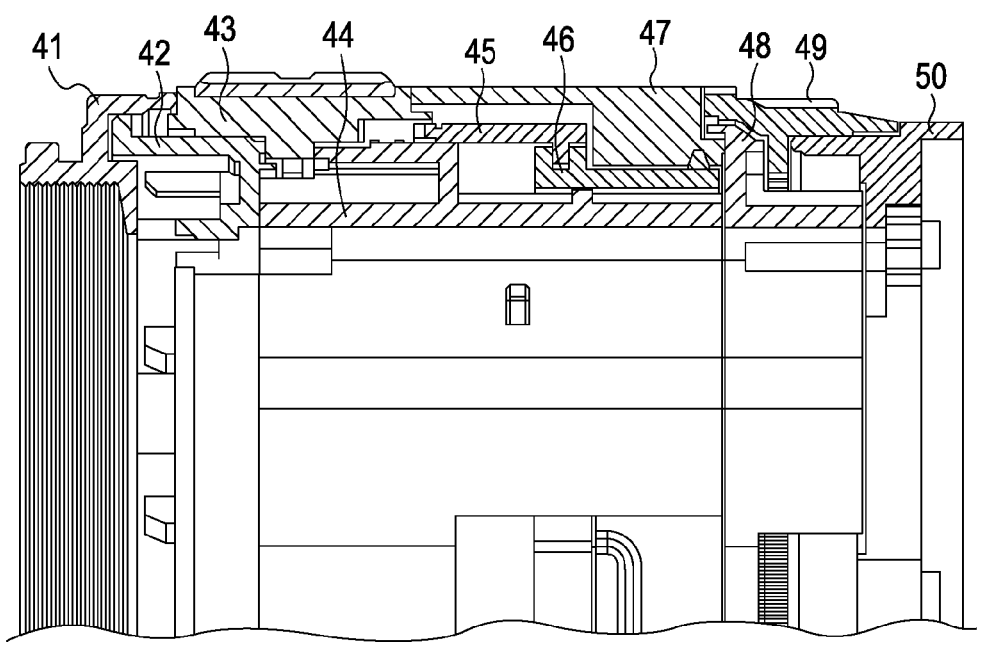
FIG. 7 is an enlarged sectional view of the exterior portion at the time of automatic focusing.

FIG. 6 is an external view of the lens exterior portion at the time of automatic focusing, and FIG. 7 is an enlarged sectional view thereof. By rotating the focus switching ring 47 around the optical axis, the intermediate ring 46 coupled thereto by the cam and the distance display ring 45 rotatably coupled to the intermediate ring 46 are moved along the optical axis to the image side. At this time, the distance display ring 45 and the manual focus ring 43 are uncoupled from each other. By this switching, the distance information written on the distance display ring 45 is also moved to the image side, and therefore the distance information becomes invisible through the information display window 47a of the focus switching ring 47.

If the user rotates the manual focus ring 43 at the time of automatic focusing, the fourth group barrel 6 is driven and focusing is performed on the basis of the detection result of the rotation detecting sensor 51.

Figure 8:
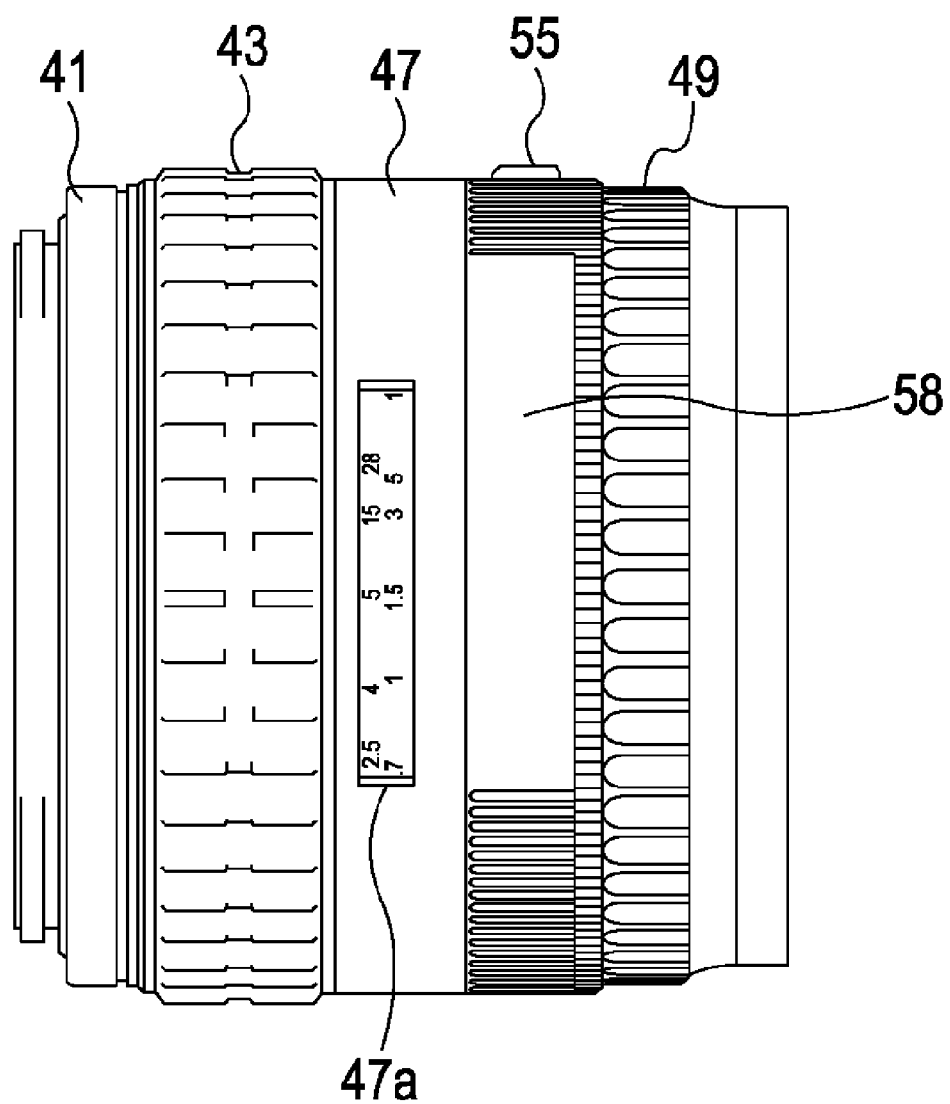
FIG. 8 is a plan view of an exterior portion in which a focus switching ring is separate from an information display window.

In this embodiment, the information display window 47a is provided in the focus switching ring 47 and therefore rotates together therewith. However, as shown in FIG. 8, the focus switching ring 47 may be fixed without having a switching function, and switching between manual focusing and automatic focusing may be performed using a switching ring 58 that is separate from the focus switching ring 47.

In the above-described embodiments, display information of object distance or the like can be made visible only at the time of manual focusing, by rotating the switching member that switches between manual focusing and automatic focusing. Since display information is invisible at the time of automatic focusing, the user is not confused by a discrepancy between the actual imaging distance and the display information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-179371 filed Jul. 31, 2009, which is hereby incorporated by reference herein in its entirety.

What is claimed is:

1. A lens barrel comprising:
   a focus lens;
   a motor for driving the focus lens;
   a manual focus ring;
   a display unit configured to display information of object distance;
   a display member on which the information of object distance is displayed;
   a switching member configured to rotationally operate around an optical axis; and
   an intermediate ring coupled to the switching member and configured to move in an optical axis direction by rotating the switching member to enable coupling and uncoupling the manual focus ring and the display member,
   wherein the motor drives the focus lens in response to the rotation of the manual focus ring, and
   when the switching member is rotated to switch to manual focusing, the intermediate ring and the display member are moved to be coupled to the manual focus ring, and with the rotation of the manual focus ring, the information display of the display member becomes visible through the display unit, and
   when the switching member is rotated to switch to automatic focusing, the intermediate ring and the display member are moved to be uncoupled from the manual focus ring, and the information display of the display member becomes invisible through the display unit.

2. The lens barrel according to claim 1, wherein with the operation of the switching member, the display member moves to an object side at a time of manual focusing and moves to an image side at a time of automatic focusing.

3. The lens barrel according to claim 1, wherein the switching member is a focus switching ring.

4. The lens barrel according to claim 3, wherein the display unit is provided in the focus switching ring.

* * * * *